ize and

UNITED STATES PATENT OFFICE 2,138,456

ROOFING MATERIAL

Arthur Dawes MacNutt, Kenmore, N. Y., assignor to Certain-Teed Products Corporation, New York, N. Y., a corporation of Maryland No Drawing. Application July 23, 1936, Serial No. 92,145

14 Claims. (Cl. 91—68)

This invention relates to coating or sizing and, in the case of porous materials, impregnating to some extent grit or granules intended for imposition upon composition or prepared roofing.

By composition or prepared roofing I mean that type of roofing which usually is made of a sheet of rag felt, paper, asbestos or other fibrous material, which sheet is saturated with or impregnated by a relatively low melting point bituminous or hydrocarbon material and upon which sheet is superimposed a layer of higher melting point bituminous or hydrocarbon compound into which is embedded grit, granules such as crushed slate, gravel, stone or analogous material.

In the manufacture, storage and use of this type of roofing it frequently happens that certain faults and objectional defects develop which detract from its appearance, marketability and life. One of these defects is caused by the action of certain oils of the bituminous or hydrocarbon materials which, unless prevented, in time stain or tint the mineral granular surfacing of the roofing, thereby changing the original color of the surfacing material so that roofing stored for a period of time is of different color or shade than it was originally. As a result of this discoloration, roofing of various ages when applied to the same roof is easily discernible. This detracts from the appearance of the roof and frequently causes complaints to the manufacturer.

Another defect to which this type of roofing is susceptible is known as "blistering". One of the contributory causes of this defect is the presence of moisture which has been absorbed by the granular surfacing and which, upon relatively rapid temperature rise, expands into the coating layer thereby creating a cavity. A cavity thus formed may, and frequently does, break open leaving the saturated or impregnated base covered only by a thin film of coating exposed to the weather. This action is very detrimental to both the life and the appearance of the roofing and is often the cause of complaints.

Still another defect of this type of roofing is its tendency to become discolored in use by the action of the elements in causing foreign matter to penetrate or to adhere to the surfacing granules, thereby destroying their original color and appearance.

Another detrimental condition frequently experienced in roofing surfaced with some kinds of granular mineral materials is that designated as "blooming" or efflorescence. Granules of this character become coated with white deposits. Such a white deposit on the granules not only destroys the natural color of the granules when applied to the roofing and thus mars the appearance of the roof but may act to reduce the adhesion of the granules to the bituminous coating.

One of the objects of my invention is to overcome the above mentioned defects. By the practice of the invention the entire surface of each granule is so treated before application to the roofing that it is substantially completely encased, and when porous its pores are filled, with a substance which under storage and exposure conditions is substantially water insoluble and bituminous oil insoluble. This substance adhering to the granules may be transparent and substantially colorless and thus may preserve the natural original color and appearance of the granule, and consequently may preserve the original color of the roof, or it may be translucent or opaque. The granules are treated so that a film is formed about each grit particle, so that the particle is substantially sealed against the deleterious action of oil, water and other foreign material under normal storage and exposure conditions and this sealing is secured whether the sealing film is transparent and colorless or is opaque and colored.

Composition roofing material prepared with the granules of the invention may be packed closely together and may be stored for long periods without change of color due to staining or blooming. The encasing films of the invention reduce the tendency of roofing to blister and improve the adhesion of the granules to the bituminous layer upon the roofing sheet. The appearance therefore, of the roof over its extent is uniform whether laid with all freshly manufactured material or with material of different ages after manufacture, and the original appearance and protective value of the roof is maintained.

In my Patent No. 1,963,752 I have disclosed and claimed the process and the product resulting from the process which uses a solution of natural or synthetic resin, or a mixture of both, in an organic solvent, such as Kauri gum or "Amberol" dissolved in naphtha or benzol, and oleo-resinous varnishes and pyroxylin types of lacquers. By the process of said patent a transparent or semi-transparent film is formed upon the granules. The material is applied in liquid form to the mineral grit or granules prior to their application on the bituminous coating adhering to the base material of the roofing. Application of the liquid to the granules may be effected by such means as will bring the liquid in contact with and to substantially completely cover the surface of the granules. The granules so treated are subsequently dried to leave a hard or semi-hard, transparent or substantially transparent film on each grit particle or granule. Grit so treated is similar in color and appearance to untreated grit of the same quality; in fact, the original color of the granular material is preserved.

My prior application, Serial No. 727,192 filed May 23, 1934, is a division of the application resulting in said Patent No. 1,963,752. The present application is a continuation in part of said application, Serial No. 727,192. Said patent and said application broadly disclose that other materials may be used to secure a transparent or semi-transparent coating on or impregnation of the granules and that among such materials are water insoluble caseinates and water soluble caseins so treated as to form insoluble condensates when dried. These terms are intended to designate classes of materials formed from caseins, which materials are capable of being conveyed as dispersions or suspensions in liquid form to the granules to produce thereon a film suitable for the purpose which, when dry upon the granules, is substantially insoluble in water and in bituminous oil and is oil-stain resistant.

The invention of the present application, like the inventions of said prior patent and of said application proposes to form upon the granules a protecting and sealing film. The invention of the present application in one phase thereof, like said prior patent and application, proposes to form upon the granules a film or coating which substantially is transparent and colorless, so as to preserve the natural color of the granules. I have found, however, that the compounds of casein above referred to may be used not only to prevent staining and blistering but also to prevent blooming and to improve the adhesion of the granules to the bituminous coating, whether or not said compounds are colorless and transparent or contain a coloring material to produce a transparent or a translucent colored film or contain a pigment to produce an opaque film or coating.

Moreover, I have found that the materials of the invention may be applied to the granules as a film of such limited thickness that said film is substantially colorless and transparent even though the dry material in a mass, or the liquid containing the material in suspension, in volume may have a color or may be opaque or both. Thus the present invention provides also for maintaining the natural color and character of the granules with materials which in bulk quantity may have a color and in some cases may be opaque.

For the purposes of my invention I may utilize caseinates of the common metals except those designated as the alkali metals. The compounds of casein with the alkali metals for the most part are not sufficiently resistant to the action of water to be suitable for the purposes of the invention which aims to secure a substantially water insoluble film. I have made laboratory and also practical tests with various materials and have found that I may deposit caseinates on the granules from casein solutions by using a large number of different water soluble substances which will react with casein to form the insoluble caseinates. The following formula and tabulation are intended to be indicative only and the formulae provide for producing compounds of casein with typical metals of various metal grounds except the alkali metal group:

| | Pounds |
|---|---|
| Casein | 100 |
| Ammonium hydroxide, $NH_4OH$ (26° Bé.) | 17 to 78 |
| Calcium hydroxide, $Ca(OH)_2$ | 2 |
| Beta naphthol | 0.5 |
| Water | 880.5–819.5 |

For the calcium hydroxide may be substituted the following materials in the amounts indicated, with corresponding change in the amount of water to make a total weight of the suspension of 1000 lbs.

| | Pounds |
|---|---|
| Strontium hydroxide, $Sr(OH)_2.8H_2O$ | 7.0 |
| Barium hydroxide, $Ba(OH)_2$ | 8.3 |
| Barium formate, $Ba(CHO_2)_2$ | 6.0 |
| Calcium formate, $Ca(CHO_2)_2$ | 3.4 |
| Magnesium formate, $Mg(CHO_2)_2.2H_2O$ | 3.9 |
| Aluminum basic acetate, $Al(C_2H_3O_2)_2OH$ | 4.2 |
| Ferric formate, $Fe(CHO_2)_3.H_2O$ | 5.5 |
| Cobaltous nitrate, $Co(NO_3)_2.6H_2O$ | 7.6 |
| Silver nitrate, $AgNO_3$ | 4.5 |
| Lead formate, $Pb(CHO_2)_2$ | 7.8 |
| Cupric acetate, $Cu(C_2H_3O_2)_2.H_2O$ | 5.3 |
| Stannous chloride, $SnCl_2$ | 5.0 |
| Zinc chloride, $ZnCl_2$ | 3.6 |
| Ferric chloride, $FeCl_3.6H_2O$ | 7.1 |
| Cupric chloride, $CuCl_2.2H_2O$ | 4.5 |
| Barium chloride, $BaCl_2.2H_2O$ | 6.5 |
| Calcium chloride, $CaCl_2.6H_2O$ | 5.8 |

The formulae above given utilize ammonium hydroxide, $NH_4OH$, to effect solution of the casein in the water. This reagent produces a so-called alkaline solution of the casein. Solutions of casein effected by means of the hydroxides or the alkaline salts of the alkali metals, to which group ammonia belongs, also may be used with which to combine the substances indicated by the above formulae to produce the caseinates.

In a practical method of preparing the dispersion from which the caseinate may be deposited on the granules, the salt or the hydroxide of the metal with which the casein is to combine may be mixed in dry form with the casein. The preservative, beta naphthol, also may be added in dry form. These mixed powders may then be mixed with water taking care to smooth out lumps or agglomerations. This "soaking" of the casein may be continued for about an hour. The ammonium hydroxide then may be added to bring about solution of the casein, the reaction with the metallic salt or the hydroxide then forming the caseinate in suspension or dispersion, in which form it may be applied to the granules.

The metallic salts or compounds used to react with the casein to form the caseinates may be selected from a wide variety as indicated above. Preferably because of their cheapness and availability I may use the compounds of the alkaline earth metals, especially the hydroxides of these metals which seem to produce a better and more permanent dispersion.

The casein content in the formulae given above is indicated at 10% based on the weight of the ultimate mixture or suspension. This amount indicates a practical amount which will provide a suspension of suitable consistency but a range of 10 to 15% may represent a practical range. The greater the amount of water present the more material must be handled in treating the granules, and this extra water must be evaporated in the drying of the film on the granules. When too little water is used the dispersion becomes so viscous that it may not readily spread over the surfaces of the granules and greater mechanical mixing or agitation of the granules becomes necessary to effect proper coating of the granules. The viscosity of the dispersion on suspension may be reduced by raising its temperature.

When a dispersion prepared by the methods suggested above is applied to the surface of granules used in surfacing roofing materials a film of the caseinate which is substantially insoluble in water when dry may be formed upon each granule and may substantially completely encase the granule. Such a film of the water insoluble caseinate is substantially insoluble in the oils which are found in the bituminous coating on the roofing. The thickness of the film may be so limited that it is substantially transparent and colorless whether the mass of the suspension as applied to the granules is so or not.

As examples of the insoluble condensates which may be formed from water soluble caseins may be given those condensates obtained by treating casein with aldehydes such as formaldehyde, acetaldehyde and propionaldehyde. Other condensing agents which are suitable are hexamethylenetetramine or trioxymethylene, and potassium dichromate. To obtain these condensed products the casein may be dispersed in water by means of an alkaline material as described above. The proper amount of formaldehyde or other condensing agent then may be mixed therewith and a suspension or dispersion may be obtained which may be applied to the granules in the same manner as the suspensions of the water insoluble caseinates described above. Ordinarily however, only small amounts of the condensing agent may be used without disturbing the homogeneity of the dispersion because of formation of curdy gels. Preferably, therefore, I first apply to the granules the alkaline or the acid dispersion or solution of the casein and then treat the film of casein on the granule with the condensing agent. I may apply the condensate after completion of the application of the casein solution and during the drying process but preferably after the film has dried.

It also is possible to prepare solutions of casein using acids, such as hydrochloric, acetic, citric, formic and oxalic acids and such solutions may be used for the purpose of treating the granules to deposit thereon a coating of a condensate of casein, by action with any of the condensing agents mentioned above.

These insoluble condensates so applied to the granules in a thin film may be transparent or substantially transparent and may permit the natural color of the granules to be seen through the film. In some cases, however, I may utilize films or coatings of condensates which are opaque and are colored naturally or by addition of dyes or pigments.

The amount of liquid which is applied to the granules to produce the desired thickness of film, and especially to produce the transparent or substantially transparent film, may be varied depending upon the nature of the particular coating or film forming material used and upon the porosity or absorption capacity of the granules or grit treated. The amount also may vary with the different caseins or casein solutions used. The water used to form the suspension serves as a vehicle to spread the insoluble compound of casein over the surface of the granules, and this water must be evaporated to leave the granules dry. Within the practical limits referred to above as to the consistency of the suspensions the invention is concerned essentially with the formation of the casein compound as a dried film upon the granules. Thus I may apply the same amount of casein compound, that is, as insoluble caseinate or as casein condensate, in suspensions having greater or less amount of water. The invention provides for control of the quantity of suspension for coating the granules in relation to the amount of the granules in order that the desired thickness of the dry film may be obtained. This desirable thickness is evidenced by the practical results of substantial transparency and substantial absence of color or on the other hand by the practical tests as to adhesion, prevention of blistering and blooming, etc., while maintaining the individuality and also the form of the granules.

For the purposes of the invention in this respect, therefore, an amount of the insoluble caseinate or of the casein condensate in relation to the weight of the granules may be from 4 to 20 lbs. per ton. In order to apply this amount of material as a dry coating or film on the granules an amount of the suspension in the range of 4 to 20 gals. per ton of granules may be used when the suspension carries about 10% of casein. Variation may be made in the consistency of the liquid mixture and in the amount of said liquid mixture applied per ton of granules to vary the thickness of the film on the granules.

In the claims the term "durable granular material" is used to distinguish the materials to which the invention relates from granular materials which may be soluble or friable and, therefore, would be unsuitable for the purpose of the invention because they have not the mechanical permanence which is necessary for resistance to wear and to mechanical change, to the action of the weather and to other detrimental actions which may occur in the use of granular materials in the arts. The invention, however, is not limited to mineral materials in granular form, such as slate, gravel, sand, slag, etc. but may include other granular materials such as ground cork, metallic particles and also granular materials of permanent character which may be artificially produced.

If the "solutions" or dispersions of casein in water utilized in the invention are to be kept for a time before applying to the granules a preservative such as beta naphthol or terpineol may be admixed therewith without detrimental effect upon their utility for the purpose of the invention.

If desired, in order to reduce the brittleness of the casein film and to increase resistance to abrasion and wear, a plasticizing material may be introduced into the casein solution. Such plasticizing materials and the methods of treating casein solutions therewith are well know. For the purpose of the invention, a siccative oil or a semi-drying oil such as linseed oil, chinawood oil, fish oil, castor oil and others, blown or bodied, as well as paraffin, glycerine or ethylene glycol may be used. Rubber dispersions in water, such as latex, also may be used. Also, if desired, for the purpose of improving the capacity of the "solution" for wetting the granules to increase the envelopment of the granules by the film of casein, a surface tension depressant may be added to the solution, preferably one capable of being dispersed in water. Such materials as the soluble alkali soaps, including ammonium soaps, soluble organic soaps, soluble salts of sulphonated hydrocarbons and soluble sulphonated oils may be used.

Having thus described my invention I now claim:

1. Durable granular material having thereon a coating of a compound of casein which is substantially insoluble in water.

2. Durable granular material having thereon a coating comprising a caseinate of an alkaline earth metal.

3. Durable granular material having thereon a film comprising a compound of casein insoluble in water, said film being transparent and substantially colorless.

4. Durable granular material having thereon a coating comprising a compound of casein insoluble in water, and a coloring material.

5. Durable granular material having thereon a coating of a water insoluble caseinate.

6. Durable granular material having thereon a coating of a condensate of casein insoluble in water.

7. A covering material comprising a base sheet of material, a coating of adhesive thereon, and granular surfacing material adhering to said coating, said granular material having thereon a coating containing a compound of casein which is substantially insoluble in water.

8. Process of treating durable granular material which comprises applying to the granular material a suspension in water of a compound of casein which is substantially insoluble in water.

9. Process of treating durable granular material which comprises applying to the granular material a suspension in water of a compound of casein formed in a solution of casein in water by the action of a water soluble compound of an alkaline earth metal.

10. Process of treating durable granular material which comprises applying to the granular material a suspension in water of a compound of casein formed in a solution of casein in water by the action of a substance selected from the group composed of the water soluble hydroxides, chlorides, nitrates, formates and acetates of the alkaline earth metals, aluminum, iron, cobalt, silver, lead, copper, tin, and zinc.

11. Process of treating durable granular materials which comprises applying to the granules a suspension in water of a compound of casein formed in an alkaline solution of casein in water by the addition of a substance selected from the group composed of the water soluble hydroxides, chlorides, nitrates, formates and acetates of the alkaline earth metals, aluminum, iron, cobalt, silver, lead, copper, tin and zinc.

12. Durable granular material having thereon a coating of a compound of casein which is substantially insoluble in water, said coating being of such limited thickness as to be substantially transparent.

13. Process of treating durable granular material which comprises applying to the granular material a suspension in water of a compound of casein which is substantially insoluble in water and controlling the amount of said compound of casein so applied as to form upon the granules when dried a coating which is transparent.

14. Durable granular material having thereon a coating comprising a compound of casein with a substance selected from the group composed of the water soluble hydroxides, chlorides, nitrates, formates and acetates of the alkaline earth metals, aluminum, iron, cobalt, silver, lead, copper, tin and zinc.

ARTHUR DAWES MACNUTT.

CERTIFICATE OF CORRECTION.

Patent No. 2,138,456.                                                November 29, 1938.

ARTHUR DAWES MacNUTT.

It is hereby certified that error appears in the printed specification of the above numbered patent requiring correction as follows: Page 2, second column, line 3, for the word "grounds" read groups; line 59, before "caseinates" insert insoluble; Page 3, first column, line 6, for "on" read or; line 45, for "condensate" read condensing agent,; line 47, strike out "and" and insert instead a comma; and second column, line 59, for "casein film" read film of insoluble caseinate or condensate; line 63, for "know" read known; line 73, for "casein" read caseinate or condensate; page 4, second column, after line 39 and before the signature to the specification insert the following claim -

> 15. A covering material comprising a base sheet of flexible fibrous material impregnated with asphalt, a coating of asphalt adhering thereto and granular surfacing material adhering to said coating, said granular material having thereon as a coating a compound of casein which is substantially insoluble in water. ;

and that the said Letters Patent should be read with this correction therein that the same may conform to the record of the case in the Patent Office.

Signed and sealed this 7th day of March, A. D. 1939.

Henry Van Arsdale.

(Seal)                                                Acting Commissioner of Patents.